UNITED STATES PATENT OFFICE.

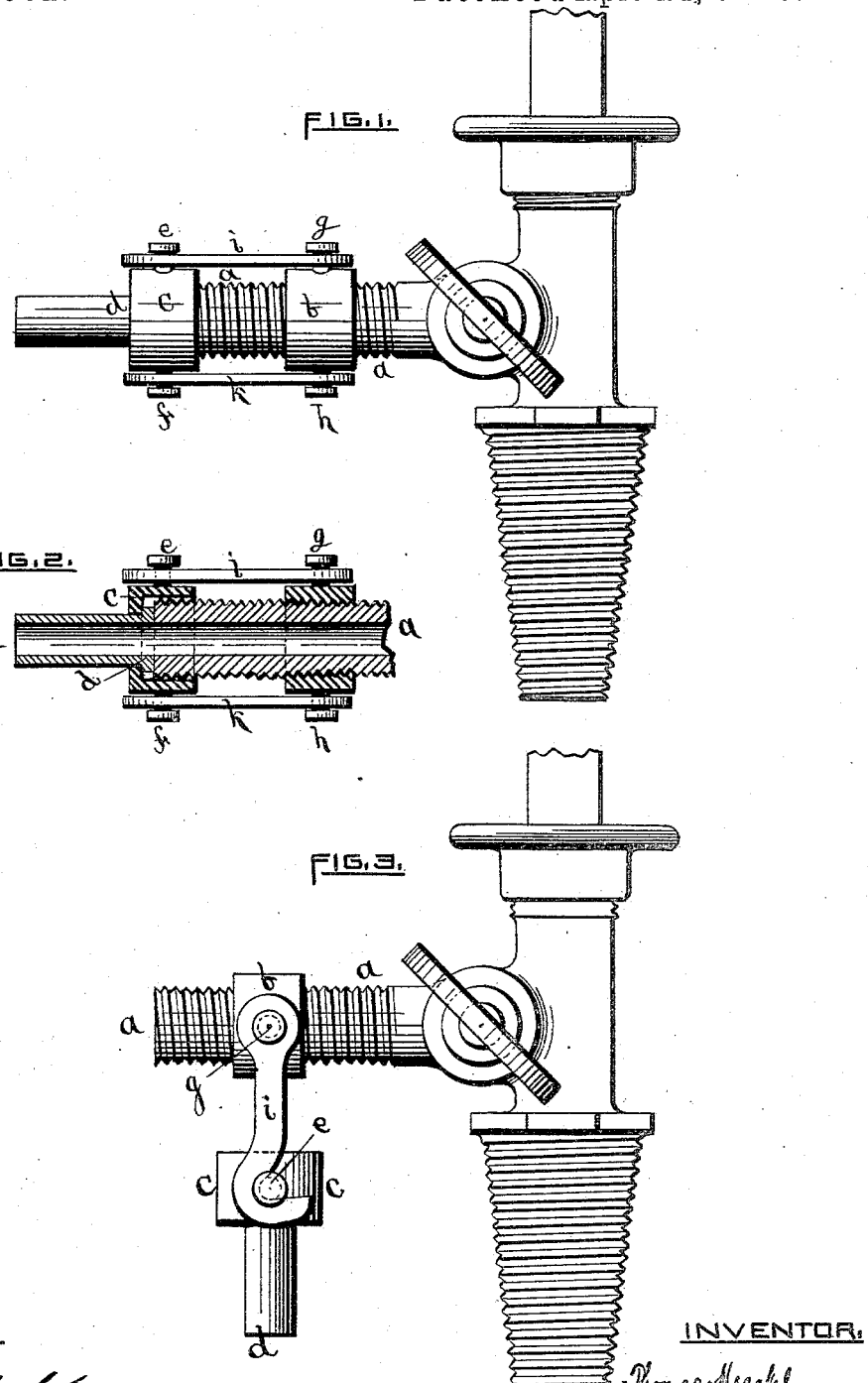

THOMAS MACKEL, OF PAWTUCKET, RHODE ISLAND.

COUPLING FOR HOSE AND FAUCETS.

SPECIFICATION forming part of Letters Patent No. 381,562, dated April 24, 1888.

Application filed September 16, 1887. Serial No. 249,845. (No model.)

*To all whom it may concern:*

Be it known that I, THOMAS MACKEL, a citizen of the United States, residing at Pawtucket, in the county of Providence and State of Rhode Island, have invented a certain Improvement in Couplings for Hose and Faucets, of which the following is a specification.

My said invention relates to a coupling for connecting pipes or hose to cocks and faucets; and it consists of two parts, one of which is an internally-threaded sleeve on an externally-threaded extension of the mouth of the faucet, and the other is a loose coupling secured to the end of the pipe or hose, but having a smooth inner surface and connected with the sleeve aforesaid by means of hooks or clasps, as hereinafter described.

The accompanying drawings are hereby made part of this specification, similar letters of reference thereon indicating corresponding parts.

Figure 1 is a perspective view of my said device as attached to a faucet designed for use with barrels. Fig. 2 shows a vertical section of said device, the cock or faucet being detached therefrom. Fig. 3 is a like view to that shown in Fig. 1, excepting that a side view of the sleeve, hook, and coupling is presented.

$a$ shows the threaded extension of the mouth of the faucet, and $b$ the sleeve thereon.

$c$ is the coupling, loose upon the end of the pipe or hose $d$.

$e f$ and $g h$ are lugs on the outside of the sleeve $b$ and coupling $c$; and $i k$ are hooks or clasps fitting onto said lugs for the purpose of connecting or disconnecting said coupling and sleeve.

The clasps $i k$ may be fastened either to the sleeve $b$ or coupling $c$, as may be desired; but I have preferred to have them hang from the sleeve and hook on the lugs on the coupling. Suitable packing may be inserted within the coupling $c$, to be fitted between the end of the faucet-extension $a$ and the end of the pipe or hose $d$; or the close fitting of these parts may be attained by means of a "ground-joint," so called.

The use of the device is by placing the loose coupling $c$ on the end of the faucet-extension $a$ and hooking the clasps $i k$ upon the lugs $e f$ or $g h$, as the case may be. Then by turning the sleeve upward on the faucet-extension the hooked clasps will compel the coupling $c$ to follow it, and the pipe and faucet ends may be thus quickly and firmly joined. A large gain over the common threaded couplings lies in the fact that there cannot be any cross-threading, the sleeve always being in readiness for instant use.

Having thus described my said invention, what I claim as new, and desire to secure by Letters Patent, is—

The combination, with a flanged pipe and a faucet having an externally-screw-threaded extension, of a loose coupling engaging the flange on the pipe and provided with lateral lugs, an internally-threaded sleeve on said extension provided with lateral lugs, and clasps in engagement with the lugs on the said coupling and sleeve, substantially as described.

THOMAS MACKEL.

Witnesses:
 THOS. P. BARNEFIELD,
 GEORGE M. REX.